May 19, 1925.
H. KISTNER
PISTON AND PISTON RING
Filed June 1, 1920
1,538,120
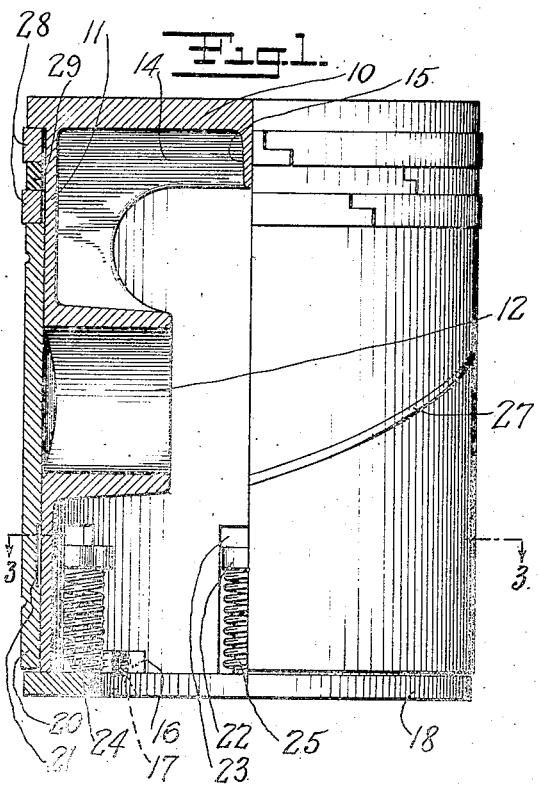
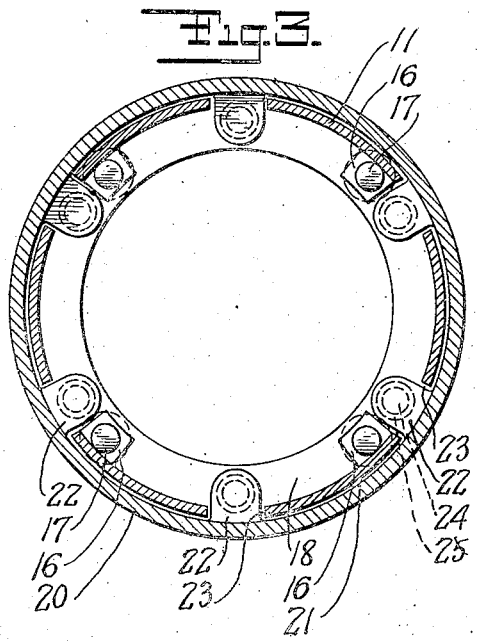
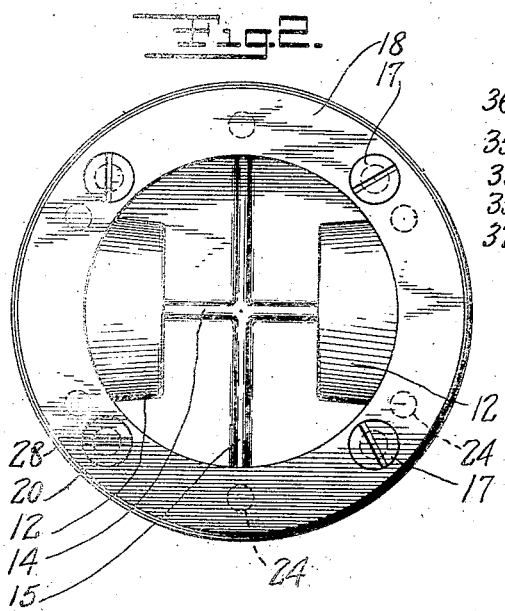
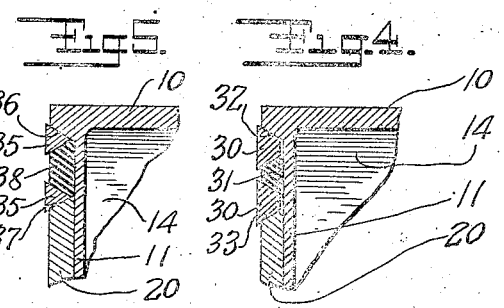
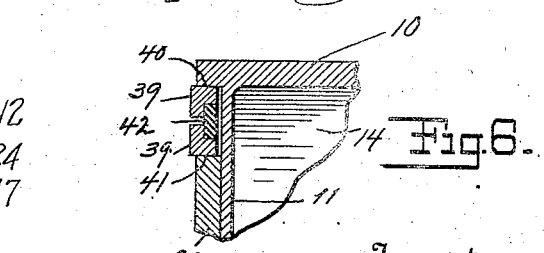
Inventor
Herman Kistner
By his Attorney
Fred'k C. Fischer Patented May 19, 1925.

1,538,120

UNITED STATES PATENT OFFICE.

HERMAN KISTNER, OF ELIZABETH, NEW JERSEY.

PISTON AND PISTON RING.

Application filed June 1, 1920. Serial No. 385,699.

*To all whom it may concern:*

Be it known that I, HERMAN KISTNER, a citizen of the United States, residing in the city of Elizabeth, in the county of Union and State of New Jersey, have invented certain new and useful Improvements in Pistons and Piston Rings, of which the following is a specification.

The principal object of the invention is to provide a novel and practical piston for engine cylinders, particularly of the internal combustion type, having combined therewith easily renewable piston rings, resiliently held in lateral compression, preventing wearing of the piston and the accumulation of carbon deposits.

Another object is to provide improved means for automatically and uniformly expanding the piston rings, thereby maintaining a leakless working fit at all times.

These and other analogous objects, which will appear as the description proceeds, are attained by the novel construction, combination and arrangement of parts hereinafter described and shown in the annexed drawings, forming an essential part of this disclosure, and in which:—

Figure 1 is a partial side elevational, partial longitudinal sectional view of a piston made in accordance with the invention.

Figure 2 is a bottom plan view of the same.

Figure 3 is a transverse sectional view taken on lines 3—3 of Figure 1.

Figure 4 is a fragmentary sectional view of the piston showing a modified form of ring.

Figures 5 and 6 are views similar to Figure 4, but showing other modifications in packing rings.

Referring to the drawings in detail, the numeral 10 designates the disc like head of the piston, from which integrally extends a cylindrical body 11 of lesser diameter, and formed therewith, upon opposite sides, are the wrist pin bearings 12, the same being bored transversely of the piston and faced upon their inner adjacent edges.

Webs 14 extend from the bearings 12 to the head 10, joining a cross web 15, reenforcing the structure in a substantial manner.

At the open end of the piston are a plurality of radial lugs 16, four being here shown, suited to receive flat head screws 17, countersunk into a ring 18, and holding the same firmly against the edge of the piston.

A sleeve or jacket 20 is bored to freely fit the exterior of the piston body 11 and turned to suit the bore of the cylinder in which it operates, the sleeve having an inner annular recess 21, from which project a plurality of radial lugs 22, six being shown, their curved inner ends extending through open slots 23 formed in the walls of the piston body 11.

Set in the ring 18 are guide pins 24, aligning with the lugs 22, and acting to hold in operative position coiled compression springs 25 adapted to press the lugs and sleeve 20 away from the ring 18, towards the head 10. Obviously other types and arrangement of springs may be used to secure a similar effect.

A pair of packing rings 28, having between them a spacer 29, are disposed between the extending annularly flanged portion of the piston head 10 and the upper edge of the sleeve 20, these parts being alike in diameter and pressed towards each other by the springs 25, holding the packing rings in lateral compression, the sleeve having oil grooves 27 disposed in any preferred manner in its exterior.

In this type the rings can be hammered, in order to have a proper expansion, on the inner surfaces, while in the type shown in Fig. 4, the rings 30 are of wedge shaped cross section, and can be hammered on their lateral edges, which make contact with bevelled seats 32 and 33 respectively on the flanged head and sleeve end as shown, and it will be obvious that the compression springs 25 tend directly to expand the rings which have between them a wedge shaped spacer 31.

In the modification shown, in Fig. 5, the rings 35 are of triangular cross section and can be made of rolled wire, their outer sides contacting with the seats 36 and 37 respectively on the flange and sleeve end and having between them a spacer 38, its lateral edges being bevelled to suit the rings.

In the modification shown, in Figure 6, the rings 39 are recessed in their undersides, the outside or faces contacting with the seats 40 and 41 respectively on the flange and sleeve end and having between them a spacer 42 which preferably consists of a split steel band hardened and tempered, the inner curved surface of which may be hammered in order to impart the desired tension.

The packing rings 39 may also be hammered on their inner curved surfaces to provide the same with the requisite tension.

In assembling, the wrist pin is entered in its bearings, the packing rings and spacer passed over the cylindrical body 11 without expanding the rings, thereby preventing distortion of the same, and the sleeve 20 then adjusted so the lugs 22 enter the slots in the body, the springs, together with the guide pins and ring 18 positioned and the screws 17 used to clamp the structure together.

As both ends of the wrist pin are covered by the sleeve it is impossible for it to work out or damage the cylinder.

As the rings and spacer are at all times held under lateral compression, there are no crevices for the entrance of carbon deposits and practically no wear of the piston takes place. Rings of any preferred type can be used, change or replacement being accomplished in an obviously easy manner.

The spacers can be solid rings or split as preferred and the sleeve 20 may also be split; in which case it becomes, in effect, a packing ring of unusual length.

All of the several parts, except the rings, may be made by die casting processes, reducing the cost of construction and it will be apparent that the piston proper, having no wear, will last indefinitely, while the other parts can be readily and inexpensively replaced.

In case the cylinder is re-bored the only change to refit the piston is to furnish a sleeve of larger diameter and such rings as may be required.

It is understood that this disclosure is to be regarded as descriptive only, and not as restrictive or limitive of the invention, of which modifications may be made without deviating from the general scope herein indicated and denoted in the appended claims.

I claim:

1. A piston including a hollow cylindrical body having slots opening through one end thereof and a head formed at the opposite end having an extended annular flange, a sleeve slidable on said body exteriorly thereof and overlying said slots, packing rings disposed between adjacent surfaces of said flange and the end of said sleeve, a ring secured to the end of said body opposite the head and closing the open ends of said slots, and means arranged in said slots between said sleeve and said ring to press said sleeve toward said flange.

2. A piston including a hollow cylindrical body having slots opening through one end thereof and a head formed at the opposite end having an extended annular flange, said body having inwardly projecting lugs, a sleeve slidable on said body exteriorly thereof and overlying said slots, packing rings disposed between the adjacent surfaces of said flange and the end of said sleeve, a ring secured to the said lugs on the body and closing the open ends of said slots, and means arranged in said slots between said sleeve and said ring to press said sleeve toward said flange.

3. A piston including a hollow cylindrical body having slots opening through one end thereof and a head formed at the opposite end having an extending annular flange, a sleeve slidable on said body exteriorly thereof and overlying said slots and having inwardly projecting lugs entering said slots, packing rings disposed between the adjacent surfaces of said flange and the end of said sleeve, a ring secured to the end of said body opposite said head in opposed relation to said lugs, and means within said body and interposed between said ring and said lugs to constantly and automatically press said sleeve in the direction of said flange.

4. A piston including a hollow cylindrical body having slots opening through one end thereof and a head formed at the opposite end having an extending annular flange, a sleeve slidable on said body exteriorly thereof and overlying said slots and having inwardly projecting lugs entering said slots, packing rings disposed between the adjacent surfaces of said flange and the end of said sleeve, a ring secured to the end of said body opposite said head in opposed relation to said lugs, said ring having a plurality of projections extending inwardly of the piston one in substantial alinement with each of said lugs, and a spring arranged on each of said projections and interposed between said ring and the corresponding lug to constantly and automatically press said sleeve in the direction of said flange.

5. A piston including a hollow cylindrical body having slots opening through one end thereof and a head formed at the opposite end having an extending annular flange, a sleeve slidable on said body and having inwardly projecting lugs entering said slots, packing rings disposed between the adjacent surfaces of the said flange and the end of said sleeve, a ring secured to the end of said body opposite the head, and springs interposed between said lugs on the sleeve and said ring to press said sleeve toward said flange.

This specification signed and witnessed this 27th day of May, 1920.

HERMAN KISTNER.

Witnesses:
EDWARD A. GITT,
F. NOLL.